United States Patent [19]

Wheeler

[11] Patent Number: 4,725,317
[45] Date of Patent: Feb. 16, 1988

[54] PROCESS FOR PREPARING PIGMENT COMPOSITIONS

[75] Inventor: Ian R. Wheeler, St. Andrews, Scotland

[73] Assignee: Silberline, Limited, Edinburgh, Scotland

[21] Appl. No.: 832,027

[22] Filed: Feb. 24, 1986

Related U.S. Application Data

[63] Continuation of Ser. No. 634,583, Jul. 26, 1984, abandoned.

[30] Foreign Application Priority Data

Jul. 29, 1983 [GB] United Kingdom ............... 8320487

[51] Int. Cl.$^4$ .............................................. C09C 1/62
[52] U.S. Cl. ............................. 106/290; 106/308 M; 106/309; 252/315.2; 524/413; 524/439; 524/441
[58] Field of Search ............. 106/308 Q, 1.05, 308 M, 106/290, 1.23, 1.26, 1.29, 309; 252/315.2; 524/413, 441, 439

[56] References Cited

U.S. PATENT DOCUMENTS

3,575,900 4/1971 Penyik et al. ..................... 260/21
3,838,064 9/1974 Vogt et al. ......................... 252/384

FOREIGN PATENT DOCUMENTS

0606013 11/1931 Fed. Rep. of Germany .
1482158 4/1967 France .
1115338 5/1968 United Kingdom .

Primary Examiner—Amelia Burgess Yarbrough
Attorney, Agent, or Firm—Murray and Whisenhunt

[57] ABSTRACT

The invention relates to a process for preparing low- or non-dusting substantially completely non-volatile metal pigment compositions by forming a coherent paste comprising an organic binder medium, an organic liquid vehicle and metal pigment, in powder or flake form, the paste being formed by mixing a first component comprising the organic binder medium and a second component comprising metal pigment with either or both of the first and second components comprising organic liquid vehicle and the paste containing from 1 to 70 percent, preferably from 3 to 45 percent, of the organic binder medium based on the weight of the metal pigment, and removing substantially all of the organic liquid vehicle(s) from the coherent paste, optionally after sub-dividing the coherent paste into particles, such as pellets, tablets or granules. The resulting solid metal pigment composition comprises metal pigment particles dispersed in a matrix of the organic binder material.

13 Claims, No Drawings

PROCESS FOR PREPARING PIGMENT COMPOSITIONS

This is a continuation application of Ser. No. 634,583 filed July 26, 1984, abandoned.

DESCRIPTION

The present invention relates to a process for preparing low- or non-dusting substantially completely non-volatile metal pigment compositions.

Whilst metal powders may be prepared in approximately spherical form in an atomiser, metal flakes have traditionally been prepared by either wet or dry milling processes.

From the literature (see for example U.S. Pat. No. 3,901,688), it appears that the most commonly employed method for the preparation of flake pigment is a wet ball milling process in which metal powder or chopped foil is milled with an organic liquid such as mineral spirits and a small amount of a lubricant such as oleic or stearic acid. The metal flakes so produced are separated, for example by wet sieving, to provide the desired particle size distribution and are brought to a paste-like consistency of, typically, 55-80% by weight metal content. Whilst the 20-45% by weight liquid content of such pastes may be employed as solvent in certain applications such as paints, the presence of the organic liquid in other application areas, such as plastics, is undesirable. Moreover it is found that the storage stability of metal pastes is finite, due to the tendency of the organic liquid to evaporate.

Metal flakes may also be prepared by a dry ball milling process (see for example U.S. Pat. No. 4,115,107). In this method, gas is passed through the mill at such a rate that the flake is removed as it is formed. High flow rates of gas through the mill, however, can result in dust explosions. This method of removal has other serious disadvantages. For example, only finely divided particles are removed from the mill. This can cause an accumulation of larger particles which requires the mill to be stopped periodically for their removal. A further disadvantage of this process is the tendency for cold welding, i.e. the aggregation of small particles to form larger coherent particles.

Once recovered from the mill the metal flake product remains a potential explosion hazard. This is because the dimensions of the flakes are such that they form a dust cloud under the slightest atmospheric disturbance. Once initiated, ignition of the dust cloud proceeds with explosive violence.

A further method of preparation of metal flake is by electrodeposition of a thin film of metal followed by fragmentation into flakes. Whilst this method can give flakes of narrow particle size distribution and accurately controlled thickness, it is a costly process and unsuited for large scale production. Furthermore the technique has the same serious drawback as the dry milling process, viz. explosion hazards.

There is a need for metal pigment compositions which are low- or non-dusting (to avoid or minimise the explosion hazard) and which are substantially free of volatile organic liquids.

The present invention provides a process for preparing a solid low- or non-dusting, metal pigment composition which comprises forming a coherent paste comprising an organic binder medium, an organic liquid vehicle and metal pigment, in powder or flake form, the paste being formed by mixing a first component comprising the organic binder medium and a second component comprising metal pigment with either or both of the first and second components comprising organic liquid vehicle and the paste containing from 1 to 70%, preferably from 3 to 45%, especially from 5 to 30%, of the organic binder medium based on the weight of the metal pigment, and removing substantially all of the organic liquid vehicle(s) from the coherent paste, optionally after sub-dividing the coherent paste into particles, such as pellets, tablets or granules, each containing a plurality of metal pigment particles dispersed in a matrix of organic binder medium.

For example, a solution or dispersion of the organic binder medium in an organic liquid vehicle may be mixed with dry metal pigment or with a dispersion of metal pigment in the same or a different organic liquid vehicle.

The process of the invention can be integrated with the preparation of metal flake paste by wet ball milling. Thus metal flake is prepared by ball milling metal powder or chopped metal foil with an organic liquid, such as mineral spirits, the metal flakes so produced are separated, as by wet-sieving, to provide the desired particle size distribution and are brought to a paste-like consistency of 55 to 80% by weight metal content, with the resulting paste being used directly as the second component in the process of the invention.

The resulting solid metal pigment composition comprises the metal pigment particles dispersed in a matrix of the organic binder material, the relative proportions of the binder material and metal in the solid product being substantially the same as in the coherent paste. The coherent paste preferably is sub-divided, as by pelletising, granulating or tabletting for example, to assist removal of the organic liquid vehicle(s) and the solid metal pigment composition is then in a physical form which is easy to handle, non-explosive and simple to use in a variety of applications. Preferably the solid metal pigment composition is in a particulate form such that at least 98% by weight of the particles are retained on a British Standard Sieve (B.S. 410.1976) having a 150 micrometer nominal aperture.

The organic liquid vehicle(s) can be removed from the coherent paste, for example, in a vacuum oven at elevated temperature. If in preparing the coherent paste a solution of the binder material is employed, precipitation of the binder material during organic liquid vehicle removal binds the metal particles into a coherent dust free mass. If, however, a dispersion of binder material is used, or if a solution of binder material is prematurely precipitated through contact with the metal or metal dispersion, then coherence of the product depends upon at least partial softening or melting of the binder material at the temperature at which the organic liquid vehicle is removed.

Those binder materials are preferred which form a stable concentrated solution in the same organic liquids as are used for the preparation of metal flake, e.g. mineral spirits, as this greatly simplifies the recovery of the organic liquid for re-use. In principle, however, any organic liquid or mixture of liquids which is chemically inert with respect to the metal powder and the binder material and which has a boiling point which is below the boiling point of any liquid binder used as such or formed by melting during removal of organic liquid vehicle may be employed as organic liquid vehicle.

The binder material may be any organic compound fulfilling the following criteria:

(a) the binder material should be either (i) capable of solution in an organic liquid vehicle or (ii) capable of being finely dispersed in an organic liquid vehicle;

(b) in the case of (ii), the binder material should be molten or at least softened at a temperature below the boiling point of the organic liquid vehicle;

(c) the binder material should be capable of binding together metal pigment particles (powder or flake) at ambient temperature to provide a solid, essentially non-dusting, product. Although liquid binder materials are in general unsuitable, certain liquids, for example dioctyl phthalate, can give coherent, albeit soft, granules (75 parts by weight aluminium/25 parts dioctyl phthalate for example is a soft composition, whereas an 85/15 composition is harder). Preferably therefore liquid binder materials are used, in relatively small quantities, in combination with compatible solid binder materials;

(d) the binder material should be compatible with the application system in which it is to be used (for paints and inks, those binder materials are preferred which are film formers, making a positive contribution to film integrity); and (e) the binder material should be as optically transparent as possible to maximise the light reflecting properties of metal flakes in application media intended for visual appeal.

The quantity of binder material to be employed depends upon its capability to bind together the metal particles into a coherent and non-friable mass. In this connection, the products of the invention are to be distinguished from the so-called encapsulated compositions of the prior art, wherein the function of the organic materials used is to coat individual metal particles without accretion to adjacent metal particles.

Binder material concentrations of 1–70%, based on the weight of metal pigment, have been found suitable, though 3 to 45% is preferred and especially 5 to 30%. Too low a concentration of binder material may cause insufficient binding of the metal particles. Disintegration to dust may then occur, especially during transportation of the product, leading to an explosion hazard. It has also been found that low levels of binder material can impart inferior dispersibility characteristics to the product.

Too high a concentration of binder material may give rise to a soft, malleable or tacky product form, either before or after removal of organic liquid vehicle. A quantity of binder material greater than that required to provide the desired non- or low-dusting product form of acceptable dispersibility is unnecessary, generally undesirable, and moreover often uneconomic.

The metal pigments used in accordance with the present invention include powders of such metals as aluminium, zinc, copper, nickel, brass, bronze, tin and other malleable metals and alloys and mixtures thereof. Preferred metal pigments are of aluminium, bronze and zinc. Where the metal pigments are powders of essentially spherical particles, the diameter of the particles suitably is from 2 to 200 micrometers, preferably 5 to 75 micrometers.

The metal pigments are, however, preferably in the form of flakes, and have an average particle thickness within the range of from 0.02 to 2 micrometers. The second largest dimension is less than 150 micrometers. Commercially available metal pigment flakes are particularly suited to the process of the invention. Such flakes have a second largest dimension in the range from 8 to 35 micrometers and an average thickness of 0.05 to 1.5 micrometers. They may be leafing or non-leafing. As examples of leafing and non-leafing aluminium flakes there may be mentioned respectively the "Eternabrite" (Registered Trade Mark) and "Sparkle Silver" (Registered Trade Mark) ranges of Silberline Ltd. Within each range the flakes may be coarse, medium or fine, having respectively a second largest dimension of 25 to 35 micrometers, 15 to 24 micrometers or 6 to 14 micrometers. Mixtures of two or more powders or flakes may be used. Advantageously in, for example, products intended for use in providing anti-corrosive finishes, there may be used mixtures of spherical and flake form of the same metal or of different metals.

As examples of suitable binder materials there may be mentioned natural and synthetic resins such as oxidising and non-oxidising alkyd resins, benzoguanamine resins, carboxymethyl and carboxyethyl cellulose resins, cellulose acetate, cellulose acetate propionate (CAP) and cellulose acetate butyrate (CAB) resins, copal esters, coumarone-indene and cresylic resins, epoxide esters, epoxide melamine and epoxide phenolic condensates, ester gums, ethyl and methyl cellulose, ethyl hydroxyethyl cellulose, hydroxyethyl cellulose and hydroxypropyl methyl cellulose, hydrocarbon resins such as the "Hercures" series ("Hercures" is a Registered Trade Mark), ketone and maleic resins, melamine resins, metallic rosinates and other rosin derivatives such as hydrogenated and disproportionated rosin and rosin esters, nitrocellulose resins, petroleum resins, phenolic and modified phenolic resins, polyacrylamide, polycarbonate, polyamide, polyester, polyether, polyurethane and vinyl resins. Amongst such polymeric resins there may be mentioned particularly, acrylic copolymer and acrylic ester resins, polyacrylonitrile and acrylonitrile copolymer resins such as copolymers with butadiene or vinylidene chloride; butadiene/styrene copolymers, methyl acrylate and methyl methacrylate copolymers; polybutene, polyisobutylene, polyvinyl acetal, polyvinyl acetate, polyvinyl alcohol, polyvinyl chloride, polyvinyl ether, polyvinyl pyrrolidone and polystyrene resins. Further suitable copolymers are styrene/maleic anhydride and styrene shellac resins, vinyl chloride/vinyl acetate, vinyl chloride/vinyl ether and vinyl chloride/vinylidene chloride resins. Other suitable resins are silicone resins, terpene and urea resins. Certain specific naturally occurring gums and resins may also be employed as binder materials in accordance with the invention. Amongst these, and in addition to those already mentioned, are arabic, casein, damar, dragon's blood, karoya, sandarac, tragacanth, and xanthan.

Also suitable as binder materials are waxes, both natural and synthetic. As examples of these there may be mentioned such natural waxes as beeswax, candelilla, carnauba, japan, montan and paraffin waxes, and such synthetic waxes as polyethylene and polypropylene waxes.

Though liquids are, as mentioned above, generally unsuitable for use as the sole binder material, minor quantities of, for example, naturally occurring oils such as castor oil, stand oils, soya bean oil, safflower and sperm oil and their derivatives may be used, preferably in conjunction with solid binder materials. When any liquid binder material is used it should have a higher boiling point than any organic liquid vehicle that is used.

Also suitable as binder materials are certain plasticisers and lubricants such as phthalate esters, especially the solid dicyclohexyl phthalate, fatty acid esters such as butyl oleate, acetates such as 2-ethyl hexyl acetate, adipates such as di-isodecyl adipate, camphor, polyalkylene glycol derivatives, maleates such as di-iso-octyl maleate, phosphates such as tributyl, tricresyl and tri-(2-ethylhexyl) phosphates, sebacates such as dinonyl sebacate, glycol esters, for example with fatty acids such as diethylene glycol monostearate; terephthalates, trimellitates and sorbitan esters such as sorbitan monostearate and sorbitan tristearate.

Amongst surfactants suitable as binder materials there may be mentioned anionic, cationic and nonionic types including the solid alkyl ether phosphates such as the "Crodafos CS" (Registered Trade Mark) range of Croda Chemicals Ltd, alkylaryl sulphonates and their alkali metal derivatives such as alkali toluene sulphonates, alkali xylene sulphonates, alkali naphthalene sulphonates, alkali diisopropyl naphthalene sulphonates and alkali dodecyl benzene sulphonates; alcohol sulphates such as sodium lauryl alcohol sulphate, sulphosuccinates such as sodium dioctyl sulphosuccinate, sarcosinates such as lauroyl sarcosine and stearyl sarcosine; fatty amines such as stearylamine, and distearylamine; amine salts such as coconut fatty amine acetate; alkyl phenol ethoxylates such as nonyl phenol ethoxylate; alcohol ethoxylates such as higher ethoxylated oleyl alcohol; higher polyoxypropylene-polyoxy ethylene copolymers, such as "Supronic E 800" (Registered Trade Mark) of ABM Chemicals Ltd.; alkylolamides such as myristic diethanolamide and coconut mono-isopropanolamide, esters such as propylene glycol monostearate and cetyl palmitate; maleic anhydride copolymers such as the disodium salt of maleic anhydride and di-isobutylene, sold as "Empicryl" (Registered Trade Mark) by Albright and Wilson Ltd, and the SMA series of low molecular weight styrene-maleic anhydride copolymers offered by Arco Chemical Company.

The physical form of the products of the invention may be lump, as, for example, derived from the removal of the organic liquid vehicle(s) from the coherent paste mixture of metal powder, binder material and organic liquid vehicle(s), but is advantageously a form, such as tablet, pellet, granule, flake or bead (spherical), which provides good handling properties and, optionally, meterability.

Apparatus suitable for use in the preparation of these easily handled physical forms is well known to those skilled in the art. For example tablets may be prepared by subjecting the coherent paste of metal powder, binder material and organic liquid vehicle to pressure in a die of the desired dimensions, followed by evaporation of the organic liquid vehicle as before. Pellets and granules may be formed by forcing the precursor coherent paste through a number of suitably sized holes in a plate, as for example in a commercially available granulator. The organic liquid vehicle is again removed, as by evaporation. Granules may be converted into substantially spherical beads for example, in a "Marumeriser" (Registered Trade Mark) by means of centrifugal force.

Flakes of 2–9 mm diameter and 0.1–1.5 mm thick may be prepared by application of the precursor coherent paste to a roll dryer. Evaporation of the organic liquid vehicle takes place on the heated roll of the dryer leaving a thin sheet which is stripped off and fragmented into flakes by a doctor blade.

In a particular embodiment of the process, there may be provided products in which the metal pigment may be brought to a fine dispersion in aqueous application media without the use of high shear forces. Aluminium pigments, in particular, react with water to release hydrogen gas, resulting in loss of brightness due to degradation of the metal surface. It is therefore a commercial advantage that an aluminium pigment is kept dry up to the time of use. Those binder materials, such as acrylic resins, which can be dissolved or dispersed in water or aqueous application media by addition of an alkali, or surfactants which are either self dispersing therein or dispersible by addition of acid, alkali or a wetting agent are preferred in this context.

In a preferred embodiment, binder materials which, in addition to promoting water dispersibility, also aid in preventing degradation of the aluminium pigment are most valuable. Those surfactants, such as phosphate esters, which are known in the art as corrosion inhibitors, are particularly preferred.

The invention is further illustrated by the following Examples in which all parts and percentages are by weight unless otherwise stated.

EXAMPLE 1

138.5 Parts of an aluminium flake pigment paste (SS 5500 of Silberline Ltd.) comprised of 90 parts aluminium of 18 micrometers average particle size in white spirit, was intimately mixed with 20 parts of a 50% solution of "Staybelite" (Registered Trade Mark) resin, a partially hydrogenated wood rosin, in white spirit.

The resulting stiff paste was forced through a horizontal mesh having 2.5 mm diameter holes at 5 mm centres to form coherent granules of 6 mm average length. After removing the white spirit in an air circulating oven at 80° C., there were obtained 99.3 parts of silver coloured granules containing 90% of aluminium. After vigorous agitation on a 150 micrometer sieve to BS 410.1976 for one minute, 99.2% of the granules were retained.

The granules were found to break down and disperse readily in aliphatic and aromatic hydrocarbons, ketones, esters, alcohols and dilute aqueous alkali. Alternatively they can be incorporated directly in paints and inks based on these solvents.

In a further alternative use, the granules can be incorporated directly with polyvinyl chloride granules in an injection moulding machine for the preparation of moulded articles having a uniform bright silver colouration.

EXAMPLES 2–12

Example 1 was repeated using the ingredients and proportions shown in Table 1. In each case the product was an essentially non-dusting composition similar to the product of Example 1.

TABLE 1

| EXAMPLE NO. | ALUMINIUM FLAKE PASTE DRY WT. - PARTS | BINDER MATERIAL | BINDER MATERIAL AMOUNT - PARTS | ORGANIC LIQUID VEHICLE | ORGANIC LIQUID AMOUNT - PARTS | DUST LEVEL, % |
|---|---|---|---|---|---|---|
| 2 | 90 | SYLVATAC 95 (polymerised rosin) | 10 | White spirit | 10 | 0.55 |
| 3 | 85 | KRYSTALLEX F100 (poly α-methyl-styrene) | 15 | White spirit | 15 | 0.09 |
| 4 | 85 | LAROPAL A81 (aldehyde resin) | 15 | White spirit | 15 | 0.24 |
| 5 | 85 | LAROPAL ALR 8652 (aldehyde resin) | 15 | solvesso 100 | 15 | 0.20 |
| 6 | 85 | HERCURES A100 (hydrocarbon resin) | 15 | white spirit | 15 | 0.11 |
| 7 | 80 | CAB 551 (cellulose acetate butyrate) | 20 | Cellosolve Acetate | 30 | 0.06 |
| 8 | 85 | ENNESIN GM105 (glycerol esterified rosin/maleic adduct) | 15 | white spirit | 15 | 0.19 |
| 9 | 90 | MONTAN WAX | 10 | white spirit | 10 | 0.13 |
| 10 | 90 | PLEXIGUM N472 | 10 | solvesso 100 | 23.3 | 0.33 |
| 11 | 90 | CRODAFOS C55 (alcohol ethoxylate phosphate) | 10 | solvesso 100 | 10 | 0.28 |
| 12 | 85 | ETHYL CELLULOSE N10 | 15 | solvesso 100 | 35 | 0.21 |

EXAMPLE 13

138.5 Parts of the aluminium flake pigment paste of Example 1 were intimately mixed with 20 parts of a 50% solution of "Staybelite" resin in white spirit, 22.5 parts of a yellow organic pigment composition (MICROLITH Yellow 2R-A; CIBA-GEIGY Ltd) 2.5 parts of a red organic pigment composition (MICROLITH Magenta G-A; CIBA-GEIGY Ltd) and 10 parts white spirit.

The resulting stiff paste was granulated and dried as in Example 1 to produce 124 parts of pale gold coloured granules having a dust level of 0.14%. When incorporated in an ethyl cellulose based ink medium by low energy stirring, there was produced a deep rich gold colouration with excellent printing properties.

EXAMPLE 14

136.2 Parts of a leafing grade aluminium pigment ("Eternabrite" 601-1 of Silberline Ltd), containing 90 parts of aluminium, were intimately mixed with 20 parts of a 50% white spirit solution of a coumarone-indene resin (Britrez PA95 of British Steel Chemicals Ltd).

The resulting paste was granulated and dried as described in Example 1, to yield 99.1 parts of bright silver hard granules having a dust level of 0.09%.

When compared with the starting leafing paste in a proprietary hydrocarbon solvent based modified alkyd paint system at equal metal content the product of this example performed very similarly in respect of opacity, gloss and brightness.

EXAMPLE 15

95 Parts of zinc flake paste (21HF of Silberline Ltd), containing 85 parts zinc flake were dispersed in 30 parts of a 50% solution of an unmodified hydrocarbon resin (Sheberez 100) in white spirit by high speed paddle stirring. The moderately fluid paste was dried on a roll dryer at 90° C. to produce a thin flake form, having a dust level of 1.08%.

When incorporated in an alkyd-hard resin primer system, the product of this Example provided a high degree of covering power and a uniformly smooth finish.

EXAMPLE 16

Using the method of Example 1, 90 parts of a pale gold bronze powder (Ronald Britton Ltd) and 20 parts of a 50% white spirit solution of low molecular weight poly α-methyl styrene resin were mixed and formed into granules.

When formulated in an ethyl cellulose ink system, the product of this example provided similar colouristic properties to those of the starting bronze powder at equal metal content.

EXAMPLE 17

126.3 Parts of an aluminium flake paste of 8 micrometers average particle size, containing 85 parts of metal were formed into granules using 30 parts of a 50% solution of Damar (A. F. Suter & Co. Ltd.) in white spirit. 20 Parts extra white spirit were required to obtain a satisfactory viscosity for granulation.

The dried granules were incorporated in an ester based nitrocellulose lacquer system to provide an excellent gloss metallic finish.

EXAMPLE 18

Example 6 was repeated with the replacement of the aluminium paste by 109.1 parts of an aluminium flake paste having an average particle size of 53 micrometers and a metal content of 85 parts.

A granular product of similar physical properties was obtained.

EXAMPLE 19

Example 12 was repeated with the addition of 10 parts Savinyl Yellow 2RLS dyestuff powder (Sandoz Ltd) and 30 parts Solvesso 100 to the aluminium flake-binder material paste. After mixing thoroughly, granulating and drying, there were obtained 109.5 parts of pale gold granules having a dust content of 0.15%.

On dispersion by paddle stirring in an ethyl cellulose ink system the colour strength of the dyestuff was fully developed to produce a bright mid gold colouration.

EXAMPLE 20

84.3 Parts of an acid resistant purity non-leafing aluminium flake paste containing 70 parts aluminium flake of 13 micrometers average particle size (SS 5000AR of Silberline Ltd) were mixed thoroughly with 60 parts of a 50% solution in white spirit of dicyclohexyl phthalate (Howflex CP of Laporte Ltd) at 55° C. The resulting stiff paste was granulated and dried at 50° C. to yield slightly soft, but coherent granules of 0.12% dust content.

When dry blended with polyvinyl chloride pellets at 5% w/w and injection moulded, mouldings having a uniform bright metallic appearance were obtained.

EXAMPLE 21

90.4 Parts of the aluminium flake paste of Example 20 were thoroughly mixed with 50 parts of a 50% solution of a poly α-methyl styrene resin (Krystallex F100 of Hercules Ltd) in white spirit. After granulating and drying at 80° C. to remove the white spirit there were obtained 99.6 parts of hard bright silver coloured granules which could be readily dispersed by low energy stirring into hydrocarbon, ester or ketone based inks and paints.

The product of this Example could also be mixed with pellets of PVC or acrylic polymers for injection moulding to provide moulded articles having a bright metallic appearance and in which the aluminium flake was uniformly dispersed.

EXAMPLE 22

95 Parts of superfine zinc dust (ISC Alloys Ltd) were added to 30 parts of a 50% solution of an epoxy resin (Epikote 1001 of Shell Chemicals Ltd) in cellosolve acetate. After thorough stirring, the moderately fluid smooth paste was applied to a roll drier, and the cellosolve acetate removed at 75° C. to yield an easily handled, low dusting (0.87% dust) flake product form.

The product of this Example was eminently suitable for the preparation of primers in which the curing agent was a reactive polyamide.

EXAMPLE 23

130.8 Parts of the aluminium flake pigment paste of Example 1, 37.5 parts of a 40% solution of an acrylic resin (Carboset XL27 of B. F. Goodrich Ltd) in cellosolve acetate, and 10 parts of cellosolve acetate were pasted thoroughly together, granulated and dried at 80° C. Well formed, firm granules of 0.25% dust level were obtained.

The product of this Example was readily dispersible in an aqueous alcoholic ink medium containing an organic amine to maintain the pH at 8-8.5.

EXAMPLE 24

63 Parts of the aluminium flake pigment paste of Example 20 were mixed with 4.7 parts of a nonyl phenol ethylene oxide condensate in 10.9 parts water. 4.5 Parts of a 10% solution of diammonium hydrogen phosphate in water were mixed in, followed by 16.9 parts of a 20% solution of glycerol in water. On thorough mixing, the mass became dry in texture. 20 Parts of water were added and worked to a thick but coherent paste which was granulated and dried at 80° C.

The dry granules, of dust content 1.82%, were easily incorporated in an aqueous ink millbase by low energy stirring to produce bright silver coloured prints.

EXAMPLE 25

130.8 Parts of a non-leafing aluminium paste, containing mineral spirits and 85 parts medium particle size aluminium flake, were intimately mixed with 1 part of an alcohol ethoxylate phosphate surfactant in a slow speed Z-blade mixer. 5 Parts of 2,4,7,9-tetramethyl-5-decyn-4,7-diol (Surfynol 104; Air Products Ltd) dissolved in 14 parts of an alcohol ethoxylate (Texafor V27; ABM Chemicals Ltd) were added and thoroughly mixed. The resulting paste was extruded through a die having holes 3 mm (0.125 inch) in diameter and dried at 65° C. The granules thus formed had excellent dispersibility in water alone and in aqueous ink and paint resin systems.

EXAMPLE 26

173.8 Parts of a leafing aluminium flake pigment paste (Eternabrite 301 of Silberline Ltd), containing 120 parts of aluminium, were blended with 7.5 parts of an alcohol ethoxylate phosphate. 18.5 Parts of an alcohol ethoxylate surfactant were added, followed by a solution of 4 parts of a part-hydrolysed polyvinyl acetate resin (Gelvatol 20-30; Cairn Chemicals Ltd), dissolved in 8 parts water. After further thorough mixing, the paste was extruded into granules and dried at 65° C.

On gentle stirring in water, the dry granules dispersed readily, with retention of the leafing properties of the pigment.

EXAMPLE 27

18.7 Parts dicyclohexyl phthalate (Howflex CP; Laporte Ltd) and 3.3 parts dioctyl phthalate (B.I.P. Ltd) were heated together until a homogeneous liquid was obtained. The liquid was intimately mixed with 136.4 parts of a medium particle size non-leafing aluminium flake pigment paste (SPARKLE SILVER 5500; Silberline Ltd), containing 88 parts aluminium, and extruded to form granules. After drying at 70° C., the granules were blended with PVC granules and injection moulded to give articles with a uniform bright metallic finish.

EXAMPLE 28

56 Parts of a polyethylene wax (PE 520; Hoechst UK Ltd) and 14 parts of a paraffin wax (Kerawax 422; Kerax Ltd) were dissolved in 70 parts mineral spirits at 130° C. and thoroughly mixed with 203.4 parts of a medium particle size non-leafing aluminium flake pigment paste (130 parts aluminium) preheated to 65° C. After cooling to 40° C., the mixture was extruded into granules and dried at 70° C. The dry granules were eminently suited for the colouration of low density polyethylene.

I claim:

1. A process for preparing a solid low- or non-dusting, metal pigment composition which comprises forming a coherent paste consisting essentially of an organic binder medium, an organic liquid vehicle and metal pigment, in powder or flake form, the paste being formed by mixing a first component comprising the organic binder medium and a second component comprising metal pigment with either or both of the first and second components comprising organic liquid vehicle and the paste containing from 3 to 45 percent of the organic binder medium based on the weight of the metal pigment, and either sub-dividing the coherent paste into particles and removing substantially all organic liquid vehicle from the particles, or removing substantially all organic liquid vehicle from the coherent paste and sub-dividing the resulting mass into particles, at least 98 percent by weight of the resulting particles being retained on a sieve having a 150 micrometer nominal aperture and each containing a plurality of metal pigment particles dispersed in a matrix of organic binder medium, the organic binder medium being capable of solution or dispersion in the organic liquid vehicle and of binding the metal pigment particles at ambient temperature and when capable of dispersion in the organic liquid vehicle having a melting or softening temperature below the boiling point of the organic liquid vehicle.

2. A process according to claim 1 wherein the coherent paste contains from 5 to 30 percent of the organic binder medium based on the weight of the metal pigment.

3. A process according to claim 1 wherein a solution or dispersion of the organic binder medium in an organic liquid vehicle is mixed with dry metal pigment or with a dispersion of metal pigment in the same or a different organic liquid vehicle.

4. A process according to claim 1 wherein the organic liquid vehicle comprises mineral spirits.

5. A process according to claim 1 wherein the binder material is soluble or dispersible in water or an aqueous application medium.

6. A process according to claim 1 wherein the metal pigment is of aluminium, bronze or zinc.

7. A process according to claim 1 wherein the metal pigment is in the form of flakes having an average particle thickness of 0.02 to 2 micrometers and a second largest dimension of less than 150 micrometers.

8. A process according to claim 7 wherein the metal pigment flakes have an average thickness of 0.05 to 1.5 micrometers and a second largest dimension of 8 to 35 micrometers.

9. A process according to claim 7 wherein the second component is a paste of 55 to 80 percent by weight metal flake content prepared by wet ball-milling metal powder or chopped metal foil with an organic liquid vehicle and separating the resulting metal flakes to provide the desired particle size distribution, with the resulting flake paste being directly used as the second component for mixing with the first component to produce said coherent paste.

10. A process according to claim 1 wherein the metal pigment is a powder of essentially spherical particles of 2 to 200 micrometers diameter.

11. A process according to claim 10 wherein the particles have a diameter of 5 to 75 micrometers.

12. The metal pigment composition prepared by the process of claim 1.

13. The metal pigment composition prepared by the process of claim 9.

* * * * *